May 14, 1968     D. F. BAHRS     3,382,993
ONE-MAN BOAT LOADER
Filed June 3, 1966     2 Sheets-Sheet 1
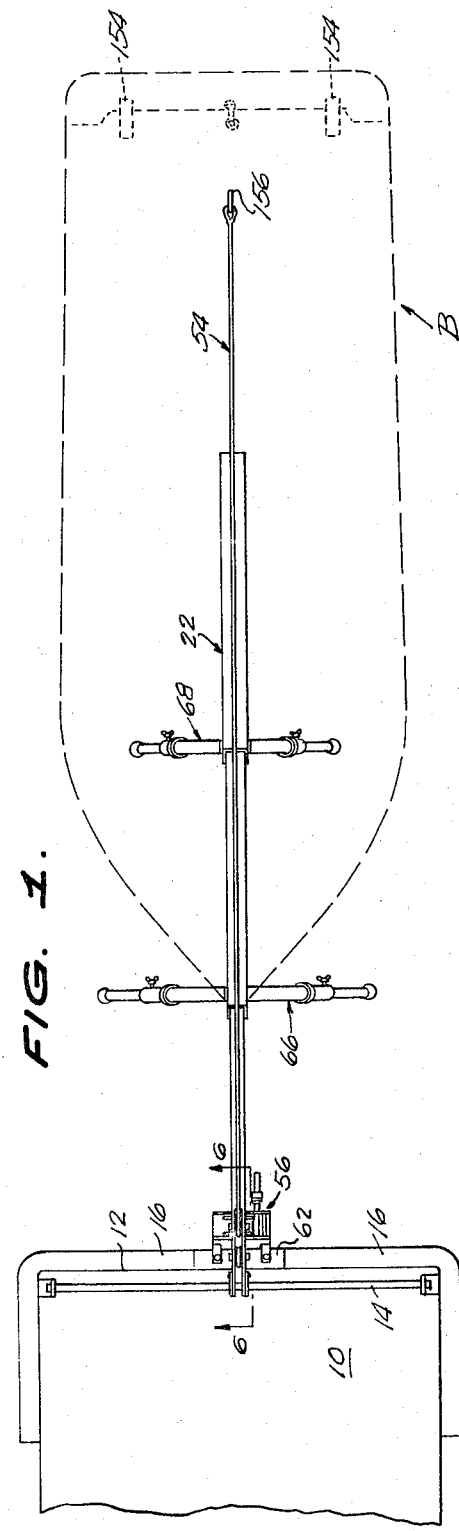
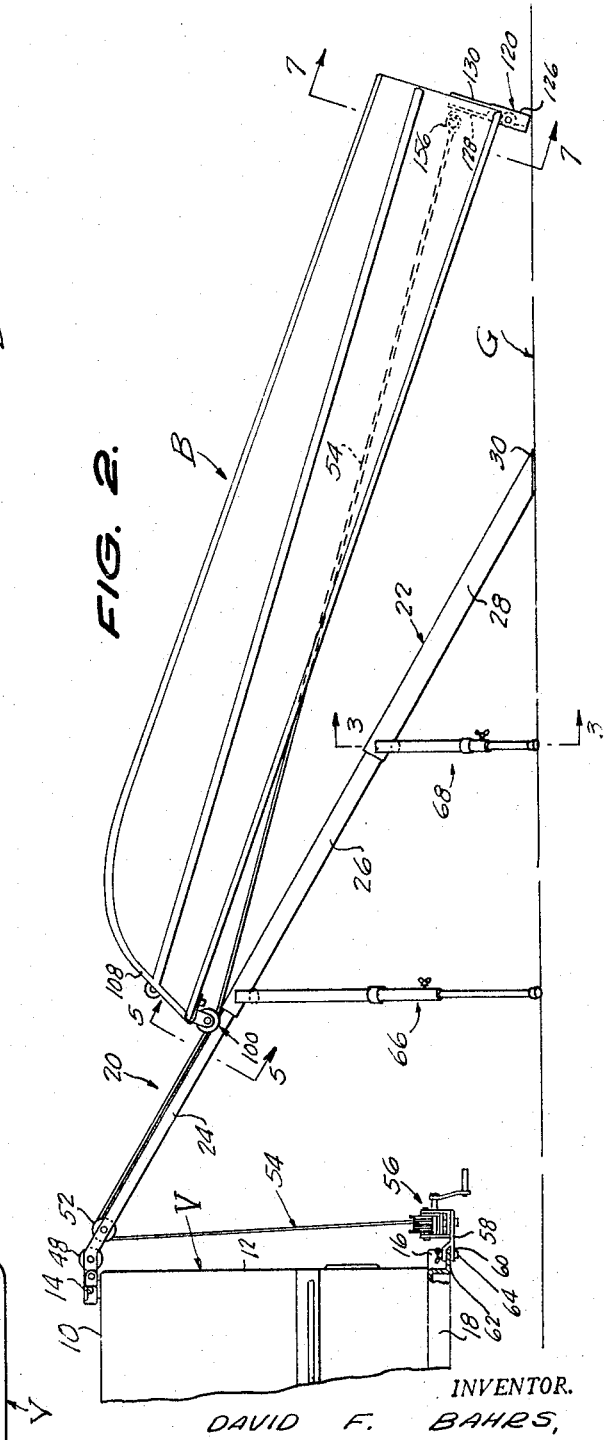
INVENTOR.
DAVID F. BAHRS,
BY
Berman, Davidson & Berman
ATTORNEYS.

May 14, 1968  D. F. BAHRS  3,382,993
ONE-MAN BOAT LOADER
Filed June 3, 1966  2 Sheets-Sheet 2
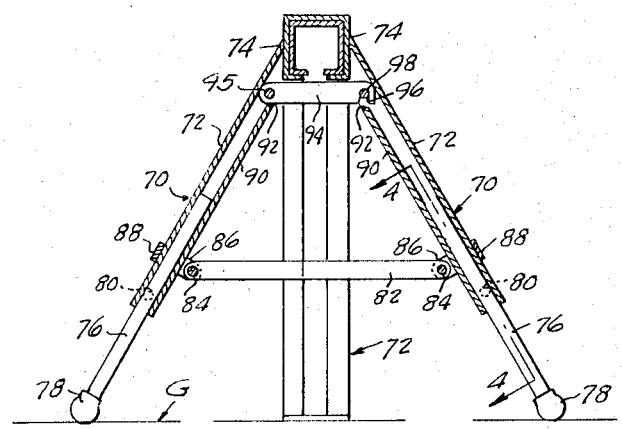
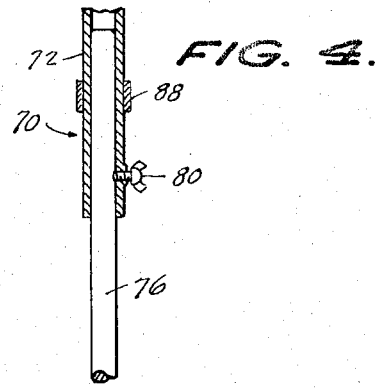
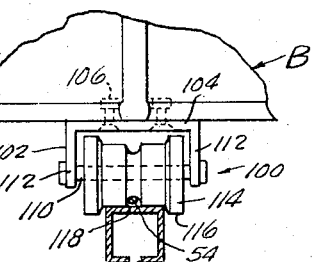
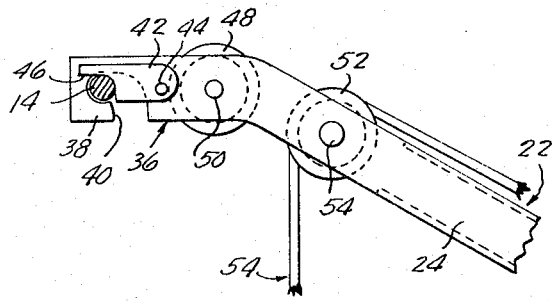
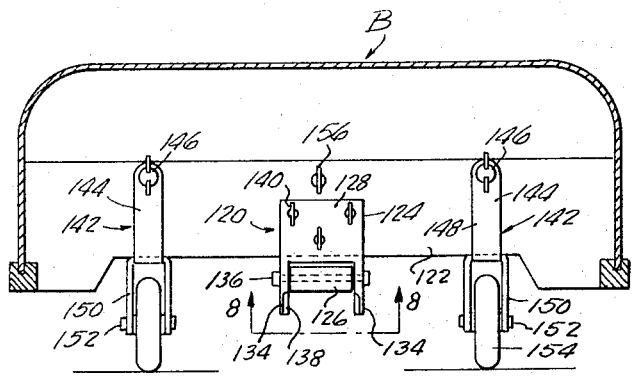
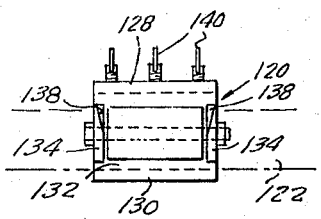
INVENTOR.
DAVID F. BAHRS,
BY
Berman, Davidson & Berman
ATTORNEYS.

United States Patent Office 3,382,993
Patented May 14, 1968

3,382,993
ONE-MAN BOAT LOADER
David F. Bahrs, 8941 Madison Ave.,
Fair Oaks, Calif. 95628
Filed June 3, 1966, Ser. No. 555,087
6 Claims. (Cl. 214—450)

ABSTRACT OF THE DISCLOSURE

Means for loading a boat from the ground onto the roof of a vehicle-body, said means comprising: a rail having a forward end secured on the roof at one end of the body, said rail being disposed at a downward angle relative to the roof, said rail having a rear end adapted to rest upon the ground, said rail having a pulley wheel journaled thereon adjacent to its forward end, a winch mounted on the end of the body below the forward end of the rail, a winch cable wound on the winch and trained over and extending rearwardly from said pulley wheel along the top of the rail, front and rear roller assemblies adapted to rest and roll upon the top of said rail, said assembly being adapted to be secured to front and rear parts of a boat, and winch cable-attaching means on the rear end of the cable adapted to be secured to a rear part of the boat, whereby the boat may travel up said rail to said roof by actuation of the winch.

---

This invention relates to a one-man boat loader for loading a boat from the ground onto the roof of a station wagon, camper vehicle, and the like.

The primary object of the invention is the provision of an efficient, easily used, and inexpensive device of the kind indicated, on which a car-top boat can be quickly and easily placed for winching onto a boat carrier located on the roof of a vehicle, the loading operation calling for no more exertion on the part of one person than initially inverting the boat on the device, connecting a winch cable to the boat, operating the winch, and finally, disconnecting the winch cable from the boat.

Another object of the invention is the provision of a simple, knock-down device of the character indicated above, which can be set up and knocked down quickly, and when knocked down, forms a compact package for easy transportation and storage.

In the drawings:

FIGURE 1 is a top plan view, showing the device of the invention set up relative to a vehicle roof, with a boat, in phantom lines, in place on the device;

FIGURE 2 is a side elevation of FIGURE 1, showing a boat on the device preparatory to being winched onto the vehicle roof;

FIGURE 3 is an enlarged vertical transverse section, taken on the line 3—3 of FIGURE 2;

FIGURE 4 is a fragmentary vertical section, taken on the line 4—4 of FIGURE 3;

FIGURE 5 is an enlarged fragmentary vertical transverse section, taken on the line 5—5 of FIGURE 2;

FIGURE 6 is an enlarged fragmentary vertical longitudinal section, taken on the line 6—6 of FIGURE 1;

FIGURE 7 is an enlarged vertical transverse section, taken on the line 7—7 of FIGURE 2; and FIGURE 8 is a fragmentary bottom plan view, taken from the line 8—8 of FIGURE 7.

Referring in detail to the drawings, a vehicle body V is shown, having a horizontal roof 10, and a rear end 12, the roof having secured thereupon a transverse horizontal boat-carrier bar 14, located close to the rear end. A rear bumper bar 16 extends rearwardly from the chassis 18 of the body V.

A device 20, of the present invention, comprises a telescoping rail 22 preferably composed of a forward section 24, an intermediate section 26, and a rear section 28. The rear section 28 has a horizontal rear end 30, adapted to rest flat upon the ground G. As indicated in FIGURES 3 and 5, the rail sections are of rectangular box section with their bottom walls 32 formed with centered longitudinal slots 34.

The forward rail section 24, having the smallest cross-section of the three sections, terminates at its forward end, in an acutely-angled, normally horizontal terminal 36 which is composed solely of parallel spaced sidewalls 38, formed from their lower edges with forwardly and upwardly-curved slots 40 which are adapted to be hooked over the rear boat-carrier bar 14. A latch 42 is pivoted, as indicated at 44, at its rear end, on a sidewall 38 behind the related slot 40, and is formed in its lower end with a lower corner notch 46 adapted to engage over and behind the carrier bar 14, for holding the carrier bar in the slots 40.

A forward roller 48 is journaled, as indicated at 50, between the terminal sidewalls 38 immediately behind the latch bar 42, and extends below the terminal 36 so as to roll against the upper corner of the rear end 38 and the roof 10, of the vehicle body to facilitate engagement of the slots 40 with the carrier bar 14.

Behind the point where the terminal 36 joins the forward rail section 24, a pulley wheel 52 is journaled between the sidewalls 38, over which a winch cable 54 is adapted to be trained, rearwardly along the rail 22, and downwardly to a winch 56. The winch 56 can be of any suitable type, and has a forwardly-extending arm 58 on its base, which is equipped at its forward end with a clevis 60 adapted to embrace a central part 62 at the vehicle's rear bumper bar 16, with a bolt 64 passed through the clevis and the part 62 for easy and quick installation and removal of the winch.

The rail 22 is braced by forward and rear ground-engaging bipods 66 and 68, respectively, each of which, as shown in FIGURES 3 and 4, comprises a pair of downwardly-divergent legs 70 composed of tubular upper sections 72, having angled upper ends 74 engaged with opposite sides of the related rail sections and solid lower sections 76, sliding in the upper sections, and having non-skid tips 78 on their lower ends. Set screws 80, threaded through walls of the upper sections 74, engage the lower sections 76 for holding the same in endwise adjustments relative to the upper sections.

The bipod legs 72 are adapted to be held in spread relationship, by means of stretcher bars 82 which are pivoted at their ends, as indicated at 84, to ears 86 on rings 88 embracing the upper sections 72. The inner walls 90 of the upper sections 72 are formed with slots 92 opening to their upper ends in which are located related ends of normally horizontal latch bars 94. The latch bars 94 are pivoted at one end thereof, on pins 95 extending across the interior of an upper section 72, and having downwardly-opening notches 96 formed in their other ends, which are releasably-engaged over pins 98 extending across the interior of the other upper sections 72. With this arrangement, the related rail sections rest upon the latch bars 94 with the upper ends of the upper leg sections engaged with related sides of the rail sections, in the set-up condition of the bipods, and the bipods can be easily knocked down for storage and transportation.

As a cooperating component of the loader, the boat B is equipped with a front roller assembly 100, which, as shown in FIGURE 5, comprises an inverted U-shaped bracket 102 having a cross-member 104 fixed, as indicated at 106, to the top of the bow 108 of the boat. A fixed axle 110 extends between and through the arms 112 of the bracket, and has journaled thereon a front roller 114. The roller 114 has end flanges 116 adapted to bear against related sides of the rail 22 as the bow end of the boat, inverted over the rail 22, is moved up along the rail.

A rear roller assembly 120 is removably mounted on the transom 122 of the boat B, and comprises a bracket 124 and an unindented roller 126. The bracket 124 is composed of two vertical, spaced plates 128, 130 adapted to engage the front and rear sides of the transom 122, a cross-member 132 at the lower ends of the plates, engaged with the upper edge of the transom, and a pair of transversely-spaced pendant arms 134, traversed by an axle 136 on which the roller 126 is journaled. As shown in FIGURES 7 and 8, the front corners of the arms 134 are beveled, as indicated at 138, to serve as cams for engagement with the sides of the rail 22, as the boat B is moved upwardly therealong, for centering the bracket 124 relative to the rail and to prevent gouging of the rail. The bracket 124 is fixed removably in place on the transom by means of laterally and vertically-spaced thumbscrews 140 threaded through the front bracket plate 128, and engaging against the transom.

Before the boat B has been worked far enough onto the rail 22 to engage the rear roller 126 thereon, the rear end of the boat is adapted to be rollably supported on the ground G by means of a pair of laterally spaced, removable wheel assemblies 142, on the transom 122. The wheel assemblies 142 comprise vertical forks 144 adapted to embrace the transom, at opposite sides of the rear roller assembly 120, with the thumbscrews 146 threaded through their front legs 148 against the transom. Inverted U-shaped brackets 150 on the lower ends of the forks 144 are traversed by axles 152 on which tire-equipped wheels 154 are journaled.

For attaching the rear end of the winch cable 54 to the transom 122 and eye 156 is provided on the transom, which is centered above the rear roller assembly 120.

What is claimed is:

1. In combination, a vehicle body having an end and a roof, a rail having a forward end secured on the roof at said end of the body, said rail being disposed at a downward angle relative to the roof, said rail having a rear end adapted to rest upon the ground, said rail having a pulley wheel journaled thereon adjacent to its forward end, a winch mounted on the end of the body below the forward end of the rail, a winch cable wound on the winch and trained over and extending rearwardly from said pulley wheel along the top of the rail, front and rear roller assemblies adapted to rest and roll upon the top of said rail, said assembly being adapted to be secured to front and rear parts of a boat, and winch cable-attaching means on the rear end of the cable adapted to be secured to a rear part of the boat, whereby the boat may travel up said rail to said roof by actuation of the winch.

2. The combination of claim 1, wherein a rear horizontal transverse boat-carrier bar is fixed upon the roof at said end of the body, said rail having an angled normally horizontal terminal on its forward end, said terminal being formed with downwardly opening notch means adapted to hook over the carrier bar, and latch means pivoted on said terminal for holding the carrier bar in said notch means.

3. The combination of claim 1, wherein longitudinally spaced ground-engaging bipods support the rail at points intermediate the ends of the rail, said bipods comprising downwardly flaring legs having tubular upper section and lower sections telescoped to the upper sections, means for securing the leg sections in lengthwise adjusted relationships, the upper leg sections having parallel vertical upper ends bearing against the opposite sides of the rail, normally horizontal latch bars extending between the upper leg sections at the upper ends thereof, the latch bars being pivoted at one end thereof to an upper section and being formed, at their other ends, with downwardly opening notches, the other upper sections having pins over which the notches are adapted to engage, the latch bars serving as rests for the rail, and spreader bars extending between lower portions of the upper leg sections and pivoted thereto.

4. The combination of claim 1 wherein said front and rear roller assemblies comprise a V-shaped bracket having a cross member secured to the boat and spaced arms, and a front roller journaled between said arms, said front roller having end flanges adapted to bear against the opposite sides of the rail, said front roller being formed with a central groove accommodating the winch cable between the front roller and the top of the rail.

5. The combination of claim 1 wherein said boat has a transom, said rear roller assembly comprising a bracket having a cross-member equipped with front and rear plates receiving the transom therebetween, the cross member having spaced arms extending laterally therefrom, and a plain rear roller journaled between the last-mentioned arms.

6. The combination of claim 1 wherein the last-mentioned arms have beveled cams on their inner forward corners adapted to engage opposite sides of the rail.

References Cited
UNITED STATES PATENTS

| | | | |
|---|---|---|---|
| 2,387,082 | 10/1945 | Malling | 214—85.1 XR |
| 2,551,351 | 5/1951 | Swenson | 214—450 |
| 2,722,326 | 11/1955 | Conroy | 214—450 |
| 2,765,940 | 10/1956 | Nelson | 214—450 |
| 2,808,952 | 10/1957 | Nicholas | 214—450 |
| 3,044,643 | 7/1962 | Shaw | 214—450 |
| 3,048,291 | 8/1962 | Mabry | 214—450 |
| 3,262,591 | 7/1966 | Aldropp | 214—517 |

GERALD M. FORLENZA, Primary Examiner.

ALBERT J. MAKAY, Examiner.